(12) United States Patent
Fang et al.

(10) Patent No.: US 12,335,084 B2
(45) Date of Patent: Jun. 17, 2025

(54) CODING METHOD AND DEVICE BASED ON MULTIPLE-MODE ORTHOGONAL FREQUENCY DIVISION MULTIPLEXING WITH INDEX MODULATION (MM-OFDM-IM)

(71) Applicant: Guangdong University of Technology, Guangzhou (CN)

(72) Inventors: Yi Fang, Guangzhou (CN); Yun Xu, Guangzhou (CN); Dingfei Ma, Guangzhou (CN); Liang Lv, Guangzhou (CN); Xiaomin Li, Guangzhou (CN); Bo Nie, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/031,449

(22) Filed: Jan. 18, 2025

(65) Prior Publication Data

US 2025/0175378 A1 May 29, 2025

(30) Foreign Application Priority Data

Aug. 12, 2024 (CN) .......................... 202411096105.1

(51) Int. Cl.
*H04L 27/34* (2006.01)
*H04L 5/00* (2006.01)
*H04L 5/02* (2006.01)

(52) U.S. Cl.
CPC ........ *H04L 27/3405* (2013.01); *H04L 5/0007* (2013.01); *H04L 5/023* (2013.01)

(58) Field of Classification Search
CPC .... H04L 27/3405; H04L 5/0007; H04L 5/023
See application file for complete search history.

(56) References Cited

U.S. PATENT DOCUMENTS

| 2003/0039318 | A1  | 2/2003 | Tong |
|---|---|---|---|
| 2021/0160122 | A1* | 5/2021 | Yan .................. H04W 72/0466 |
| 2021/0218611 | A1* | 7/2021 | Yan ........................ H04L 5/0021 |

FOREIGN PATENT DOCUMENTS

| CN | 102148796 A | 8/2011 |
|---|---|---|
| CN | 114615125 B * | 9/2023 |

(Continued)

OTHER PUBLICATIONS

Zhuang Ling et al., "Optimized scheme for spectrum and energy efficiency of multiple-mode OFDM with index modulation", Systems Engineering and Electronics, vol. 42, No. 3, Mar. 30, 2020, pp. 719-726.

(Continued)

*Primary Examiner* — Kevin C. Harper

(57) ABSTRACT

A coding method based on multiple-mode orthogonal frequency division multiplexing with index modulation (MM-OFDM-IM) is provided. A coded bit sequence is divided into an index-layer sequence and a symbol-layer sequence. According to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers are determined. A constellation mode permutation corresponding to each of the plurality of subcarriers is in a symmetrical distribution. The coded bit sequence is converted into the plurality of constellation symbols. The plurality of constellation symbols are respectively loaded to the plurality of subcarriers. A coding device based on MM-OFDM-IM is also provided.

6 Claims, 10 Drawing Sheets

(56) References Cited

FOREIGN PATENT DOCUMENTS

| CN | 114866143 B | * | 4/2024 | ........... H04B 10/116 |
| CN | 118631396 A | * | 9/2024 | |

OTHER PUBLICATIONS

Zhou, Bowen, "Research and design of permutation mode based on orthogonal frequency division multiplexing index modulation", Master's thesis, Chongqing University of Posts and Telecommunications, Jan. 16, 2020, Sections 2.1 and 3.2.
Agnila Barua, "A Novel Multi-Mode OFDM with Index Modulation", University of Windsor (Canada), May 23, 2023, Entire document.
Changyoung An et al., "Multi-Mode OFDM Communication System Using the Multiple Constellations", 2020 34th International Conference On Information Networking (ICOIN 2020), Jul. 8, 2020, pp. 432-436.

* cited by examiner

CODING METHOD AND DEVICE BASED ON MULTIPLE-MODE ORTHOGONAL FREQUENCY DIVISION MULTIPLEXING WITH INDEX MODULATION (MM-OFDM-IM)

CROSS-REFERENCE TO RELATED APPLICATIONS

This application claims the benefit of priority from Chinese Patent Application No. 202411096105.1, filed on Aug. 12, 2024. The content of the aforementioned application, including any intervening amendments made thereto, is incorporated herein by reference in its entirety.

TECHNICAL FIELD

This application relates to communication techniques, and more particularly to a coding method and device based on multiple-mode orthogonal frequency division multiplexing with index modulation (MM-OFDM-IM).

BACKGROUND

Orthogonal Frequency Division Multiplexing (OFDM) has become one of the key technologies in modern wireless communication systems due to the ability to effectively combat multipath fading and frequency-selective fading.

In recent years, the application of multiple-mode OFDM with index modulation (MM-OFDM-IM) technique in OFDM systems has attracted widespread attention. This system not only adopts full permutations of the constellation modes as index information, but also transmits distinguishable signal constellation mode symbol information for each constellation symbol, leading to a high spectrum efficiency. However, in practical applications, the existing MM-OFDM-IM system still has technical problems such as insufficient communication performance and low communication reliability when subject to complex and changeable wireless channel environments.

SUMMARY

An object of the disclosure is to provide a coding method and device based on multiple-mode orthogonal frequency division multiplexing with index modulation (MM-OFDM-IM), so as to solve the technical problem of low reliability in the existing MM-OFDM-IM systems when subject to complex and changeable wireless channel environments.

In order to achieve the above object, the following technical solutions are adopted.

In a first aspect, this application provides a coding method based on MM-OFDM-IM, comprising:

(1) acquiring a to-be-encoded source sequence input from a transmitter, and encoding, by an encoder, the to-be-encoded source sequence to generate a coded bit sequence;

(2) performing bit-splitting on the coded bit sequence according to a preset constellation modulation order and a preset constellation mode number, such that the coded bit sequence is divided into an index-layer sequence and a symbol-layer sequence; wherein the index-layer sequence is configured to transmit full permutation information of the plurality of constellation modes, and the symbol-layer sequence is configured to transmit constellation symbol information carried by a plurality of subcarriers; and determining, according to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers; wherein a constellation mode permutation corresponding to each of the plurality of subcarriers is in a symmetrical distribution;

(3) converting, by a constellation symbol mapper, the coded bit sequence into the plurality of constellation symbols according to a correspondence relationship between the plurality of subcarriers and the plurality of constellation modes and a correspondence relationship between the plurality of constellation modes and the plurality of constellation symbols; and loading the plurality of constellation symbols respectively to the plurality of subcarriers for transmission; and (4) combining, by a frequency-domain multiplexer, the plurality of subcarriers into an orthogonal frequency division multiplexing (OFDM) transmission block; performing transmission preprocessing on the OFDM transmission block followed by up-conversion; and sending, by an antenna array, the OFDM transmission block to a receiver via a transmission channel; and performing, by the receiver, inverse processing on the OFDM transmission block to obtain a source estimation sequence;

wherein the plurality of constellation modes and the plurality of constellation symbols are determined through steps of:

according to the plurality of constellation modes, performing data blocking on the index-layer sequence to generate a plurality of index-layer subsequences with a fixed length;

according to the preset constellation modulation order, performing symbol segmentation on the symbol-layer sequence to generate a plurality of first symbol-layer subsequences with a fixed length; performing rearrangement on the plurality of first symbol-layer subsequences according to the plurality of constellation modes and the number of the plurality of first symbol-layer subsequences, so as to obtain a plurality of second symbol-layer subsequences with a fixed length; wherein the number of the plurality of second symbol-layer subsequences is equal to a product of the number of the plurality of constellation modes and the number of the plurality of first symbol-layer subsequences; and determining the plurality of constellation modes respectively corresponding to the plurality of subcarriers according to the plurality of index-layer subsequences, and determining which one of the plurality of constellation symbols respectively corresponding to the plurality of constellation modes is carried by each of the plurality of subcarriers according to the plurality of second symbol-layer subsequences, so as to determine a permutation of the plurality of constellation modes respectively corresponding to the plurality of subcarriers;

the permutation of the plurality of constellation modes respectively corresponding to the plurality of subcarriers is determined through steps of:

determining a median constellation symbol among the plurality of constellation symbols according to the number of the plurality of constellation modes and the preset constellation modulation order, wherein the median constellation point is located at a middle position of a collection of the plurality of constellation symbols;

performing constellation symbol division on the plurality of constellation symbols by means of sequentially extracting constellation symbols from the plurality of constellation symbols at preset intervals from the median constellation symbol to both sides, so that the plurality of constellation symbols are divided into two constellation symbol subsets, one of which consists of extracted constellation symbols and the other of which consists of unextracted constellation points;

determining whether the number of times that the constellation symbol division has been performed is less than the preset constellation modulation order; if yes, performing a next round of the constellation symbol division on individual constellation symbol subsets obtained from a current round of the constellation symbol division until the number of times that the constellation symbol division has been performed is not less than the preset constellation modulation order, so as to obtain desired constellation symbol subsets; if not, outputting the constellation symbol subsets obtained from the current round of the constellation symbol division as the desired constellation symbol subsets; and outputting the desired constellation symbol subsets as the plurality of constellation modes.

In some embodiments, the coding method further comprises: calculating a mean Euclidean intra-mode distance of each of the plurality of constellation modes; and determining a reliability among the plurality of constellation modes according to the mean Euclidean intra-mode distance.

In some embodiments, the transmission preprocessing comprises inverse fast Fourier transform (IFFT), cyclic prefix (CP) insertion and parallel-to-serial conversion.

In a second aspect, this application provides a coding device based on MM-OFDM-IM, comprising:
a sequence acquisition and processing unit;
a constellation mode information determination unit;
a constellation coding unit; and
a data transmission and processing unit;
wherein the sequence acquisition and processing unit is configured to acquire a to-be-encoded source sequence input from a transmitter, and encode the to-be-encoded source sequence to generate a coded bit sequence;
the constellation mode information determination unit is configured to perform bit-splitting on the coded bit sequence according to a preset constellation modulation order and a preset constellation mode number, such that the coded bit sequence is divided into an index-layer sequence and a symbol-layer sequence, and determine, according to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers; wherein the index-layer sequence is configured to transmit full permutation information of the plurality of constellation modes, and the symbol-layer sequence is configured to transmit constellation symbol information carried by a plurality of subcarriers; and a constellation mode permutation corresponding to each of the plurality of subcarriers is in a symmetrical distribution;

the constellation coding unit is configured to convert the coded bit sequence into the plurality of constellation symbols according to a correspondence relationship between the plurality of subcarriers and the plurality of constellation modes and a correspondence relationship between the plurality of constellation modes and the plurality of constellation symbols, and load the plurality of constellation symbols respectively to the plurality of subcarriers for transmission;

the data transmission and processing unit is configured to combine the plurality of subcarriers into an OFDM transmission block, perform transmission preprocessing on the OFDM transmission block followed by up-conversion, send the OFDM transmission block to a receiver via a transmission channel, and perform inverse processing on the OFDM transmission block to obtain a source estimation sequence;

the constellation mode information determination unit is configured to perform, according to the plurality of constellation modes, data blocking on the index-layer sequence to generate a plurality of index-layer subsequences with a fixed length, perform, according to the preset constellation modulation order, symbol segmentation on the symbol-layer sequence to generate a plurality of first symbol-layer subsequences with a fixed length, perform rearrangement on the plurality of first symbol-layer subsequences according to the plurality of constellation modes and the number of the plurality of first symbol-layer subsequences, so as to obtain a plurality of second symbol-layer subsequences with a fixed length, determine the plurality of constellation modes respectively corresponding to the plurality of subcarriers according to the plurality of index-layer subsequences, and determine which one of the plurality of constellation symbols respectively corresponding to the plurality of constellation modes is carried by each of the plurality of subcarriers according to the plurality of second symbol-layer subsequences, so as to determine a permutation of the plurality of constellation modes respectively corresponding to the plurality of subcarriers; wherein the number of the plurality of second symbol-layer subsequences is equal to a product of the number of the plurality of constellation modes and the number of the plurality of first symbol-layer subsequences; and the constellation mode information determination unit comprises a constellation mode permutation determination subunit; and the constellation mode permutation determination subunit is configured to determine a median constellation symbol among the plurality of constellation symbols according to the number of the plurality of constellation modes and the preset constellation modulation order, perform constellation symbol division on the plurality of constellation symbols by means of sequentially extracting constellation symbols from the plurality of constellation symbols at preset intervals from the median constellation symbol to both sides, so that the plurality of constellation symbols are divided into two constellation symbol subsets, one of which consists of extracted constellation symbols and the other of which consists of unextracted constellation points, determine whether the number of times that the constellation symbol division has been performed is less than the preset constellation modulation order, if yes, perform a next round of the constellation symbol division on individual constellation symbol subsets obtained from a current round of the constellation symbol division until the number of times that the constellation symbol division has been performed is not less than the preset constellation modulation order, so as to obtain desired constellation symbol subsets, if not, output the constellation symbol subsets obtained from the current round of the constellation symbol division as the desired constellation symbol subsets, and output the desired constellation symbol subsets as the plurality of constellation modes; wherein the median constellation point is located at a middle position of a collection of the plurality of constellation symbols.

In some embodiments, the coding device further comprises a reliability evaluation unit; wherein the reliability evaluation unit is configured to calculate a mean Euclidean intra-mode distance of each of the plurality of constellation modes, and determine a reliability among the plurality of constellation modes according to the mean Euclidean intra-mode distance.

In some embodiments, the transmission preprocessing comprises IFFT, CP insertion and parallel-to-serial conversion.

Compared to the prior art, the present disclosure has the following beneficial effects.

In the present disclosure, the channel polarization idea is introduced into the constellation design. The coded bit sequence is divided into an index-layer sequence and a symbol-layer sequence. Which constellation mode each of the plurality of subcarriers is adopted for and which constellation symbol each of the plurality of constellation modes is in correspondence with are determined according to the index-layer sequence, the symbol-layer sequence and the preset constellation mode number. The constellation mode permutation corresponding to each of the plurality of subcarriers is in a symmetrical distribution. According to the correspondence relationship between the plurality of subcarriers and the plurality of constellation modes and the correspondence relationship between the plurality of constellation modes and the plurality of constellation symbols, the coded bit sequence is mapped into a plurality of constellation symbols by a constellation symbol mapper. The plurality of constellation symbols are respectively loaded to the plurality of subcarriers. In this way, the combination of MM-OFDM-IM and polar codes is realized. The division method of the constellation mode sequence in the present disclosure enhances the correlation and dependence between the various constellation modes, and improves the polarization degree of the system, thus optimizing channel capacity utilization. This further facilitates the improvement of the overall performance of the multi-level polar-coded modulation scheme based on MM-OFDM-IM, resulting in enhanced anti-interference ability and transmission reliability.

BRIEF DESCRIPTION OF THE DRAWINGS

In order to illustrate the technical solutions in the embodiments of the present disclosure or in the prior art more clearly, the drawings needed in the description of embodiments or the prior art will be briefly introduced below. Obviously, presented in the drawings are only some embodiments of the present disclosure. For those of ordinary skill in the art, other drawings can be obtained based on these drawings without exerting creative efforts.

DETAILED DESCRIPTION OF EMBODIMENTS

Figure 1:
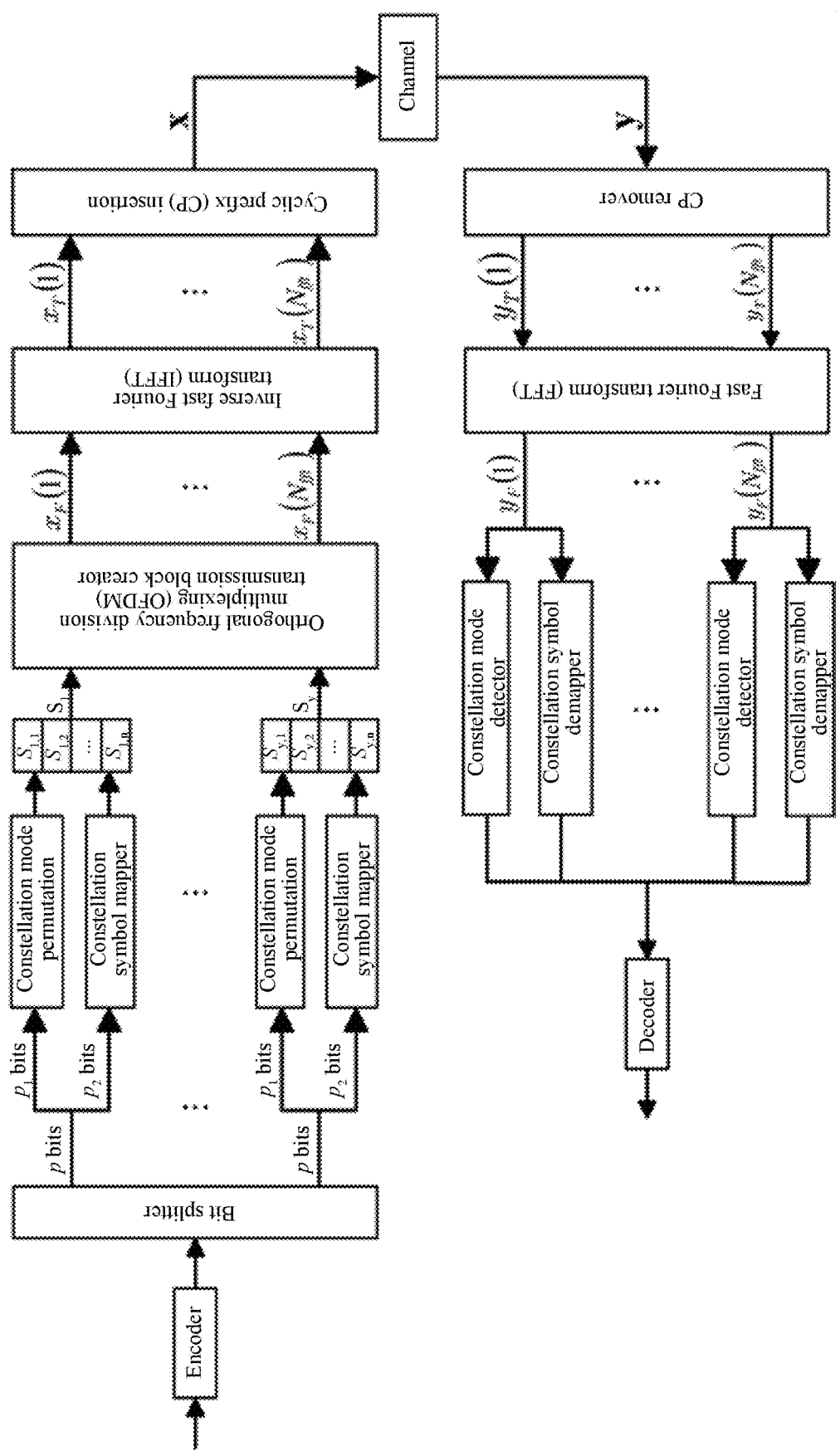
FIG. 1 is a schematic diagram of a polar-coded modulation logic architecture based on multiple-mode orthogonal frequency division multiplexing with index modulation (MM-OFDM-IM) in the prior art.

A coded modulation method based on multiple-mode orthogonal frequency division multiplexing with index modulation (MM-OFDM-IM) in the prior art is shown in FIG. 1. First, a source sequence is encoded by an encoder at a transmitting end to generate a coded bit sequence. Then, the obtained codeword is evenly divided into g sequence sub-blocks. Each sequence sub-block has $$p = \frac{N}{g}$$

coded bits, where N represents a code length. The p coded bits are divided into $p_1 = \lfloor \log_2(n!) \rfloor$ coded bits and $p_2 = n \log_2(M)$ coded bits. The $p_1$ coded bits are configured to carry information of constellation mode full permutation $\{Q_1, Q_2, \ldots, Q_n\}$ of n constellation symbols, which determine which constellation mode each subcarrier is adopted for. The $p_2$ coded bits are configured to be mapped into the constellation symbols in correspondence with the plurality of constellation modes. The g sequence sub-blocks are combined into an orthogonal frequency division multiplexing (OFDM) transmission block. The OFDM transmission block is subjected to inverse fast Fourier transform (IFFT), cyclic prefix (CP) insertion to combat inter-symbol interference and parallel-to-serial (P/S) conversion, and sent to a receiving end via a channel.

An inverse of the operation performed at the transmitting end is performed at the receiving end. First, a received signal is subjected to serial-to-parallel (S/P) conversion, CP removal and fast Fourier transform (FFT). Then, constellation mode detection is performed. n subcarriers are sorted in descending order according to an absolute value of the Rayleigh channel coefficient, that is, each subcarrier is sorted according to channel reliability. The probability that the n-th subcarrier may adopt any one of the n constellation modes is determined by means of a log-likelihood ratio (LLR) value. The constellation mode carried by each subcarrier is determined according to the order in which the n subcarriers are sorted according to channel reliability, that is, the subcarrier with the highest reliability is determined as a constellation mode with the largest LLR value, which is set as constellation mode A. The subcarrier with the second highest reliability is determined as the constellation mode with the LLR value second only to the constellation mode A. According to such a rule, the constellation mode selected by each subcarrier is determined in sequence. The constellation symbol carried by each subcarrier is determined by a symbol demapper. The detection result and the demapping result are sent to a decoder for processing to obtain a source estimation sequence.

Figure 2:
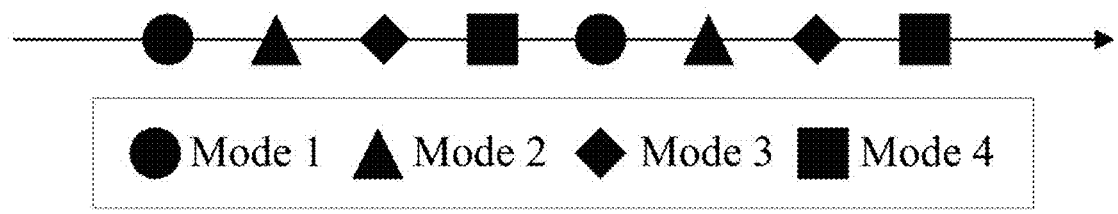
FIG. 2 shows results of constellation mode division in the prior art with 8-ary pulse amplitude modulation (8PAM)

In view of the technical problem in the existing coding technique based on MM-OFDM-IM when subject to the complex and changeable wireless channel environment, it is found that the crux of the problem lies in constellation mode division and coding in the existing MM-OFDM-IM. In the traditional MM-OFDM-IM scheme, the constellation mode is divided according to uniform distribution. The sequence structure after division is shown in FIG. 2. However, this method simply combines channel coding with the MM-OFDM-IM system without fully considering the characteristics of the two, leading to a limited improvement of actual performance and an increased complexity without the expected performance improvement. This results in the technical problems of weak adaptability to wireless channel environments and low communication reliability in the existing coding technique based on MM-OFDM-IM.

In view of this, the present disclosure provides a coding method and device based on MM-OFDM-IM, which is adopted to solve the technical problem of low reliability in the existing MM-OFDM-IM systems when subject to complex and changeable wireless channel environment.

In order to make the purpose, features, and advantages of the present disclosure more clearly understood, the technical solutions in the embodiments of the present disclosure will be clearly and completely described below in conjunction with the drawings. Obviously, described below are only some embodiments of the present disclosure, instead of all embodiments of the present disclosure. Based on the embodiments in the present disclosure, all other embodiments obtained by those of ordinary skill in the art without making creative efforts shall fall within the scope of the present disclosure.

Polar-coded modulation (PCM) is an advanced communication method with combination of polar codes and modulation technique. Polar coding is adopted to divide data streams into reliable and unreliable sub-channels to optimize channel capacity utilization. Modulation is adopted to convert the coded data into a transmittable analog signal. This method leads to improved reliability and efficiency of communication systems, and has been widely used in modern wireless communication systems such as 5th-generation mobile communication technology (5G).

A coding method based on MM-OFDM-IM of the present disclosure is described in detail below.

Figure 3:
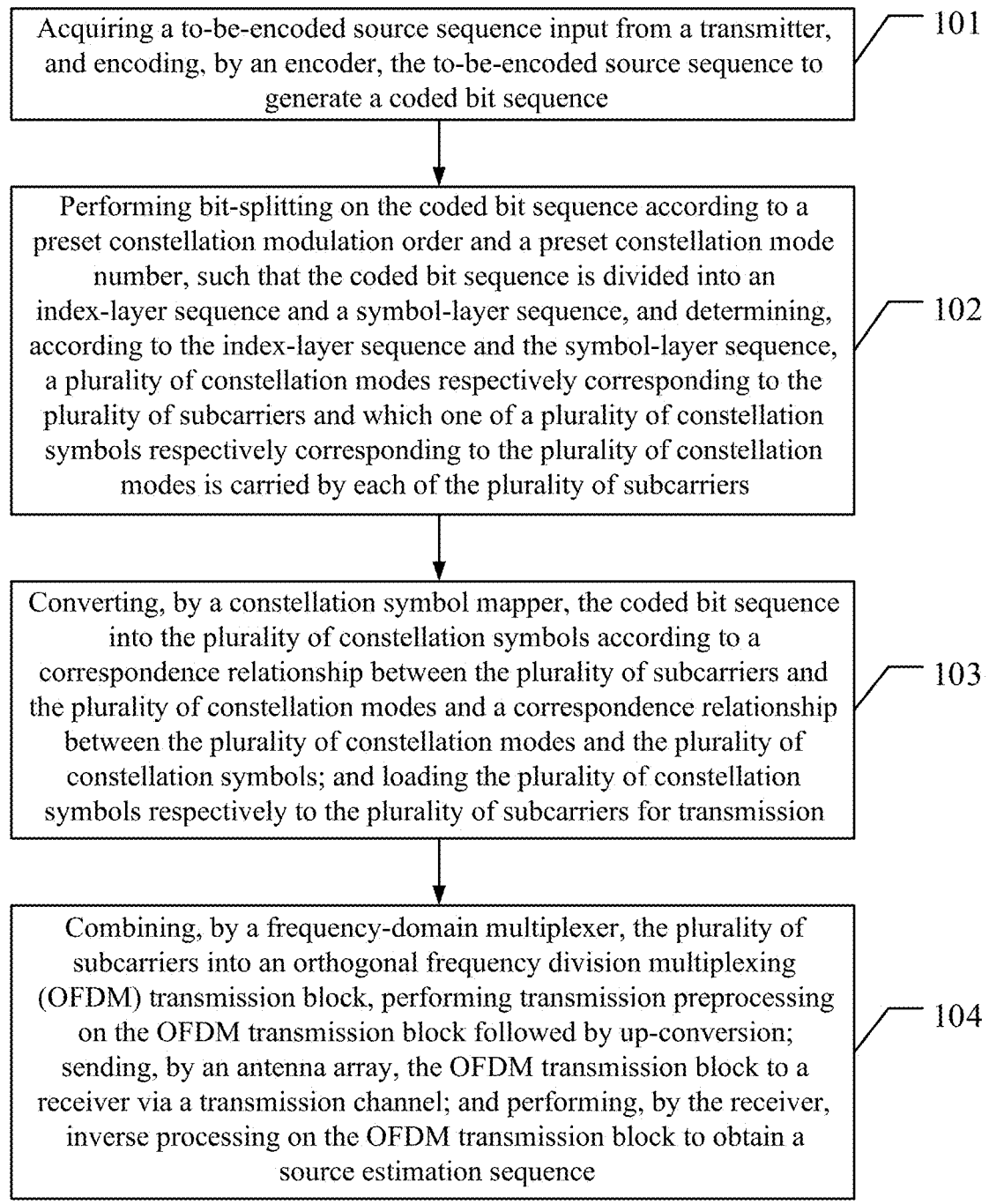
FIG. 3 is a flow chart of a coding method based on MM-OFDM-IM in accordance with an embodiment of the present disclosure.

Referring to FIG. 3, provided herein is a coding method based on MM-OFDM-IM, including the following steps.

Step (101) A to-be-encoded source sequence input from a transmitter is acquired, and encoded by an encoder to generate a coded bit sequence.

Step (102) According to a preset constellation modulation order and a preset constellation mode number, bit-splitting is performed on the coded bit sequence such that the coded bit sequence is divided into an index-layer sequence and a symbol-layer sequence. The index-layer sequence is configured to transmit full permutation information of the plurality of constellation modes, and the symbol-layer sequence is configured to transmit constellation symbol information carried by a plurality of subcarriers. According to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers are determined.

Each subcarrier is configured to carry the constellation symbol mapped from the coded bit sequence, and a constellation mode permutation corresponding to each of the plurality of subcarriers is in a symmetrical distribution.

It should be noted that, at the transmitting end, the to-be-encoded source sequence is acquired according to step (101), and then encoded according to a conventional OFDM processing method to obtain the coded bit sequence.

The coded bit sequence is evenly divided into g sequence sub-blocks. $p_1$ and $p_2$ are calculated according to the preset number of constellation modes n and the preset constellation modulation order M. $p_1$ coded bits refer to information carried by a full permutation $\{Q_1, \ldots, Q_n\}$ of the n constellation modes, which determines which constellation mode each subcarrier is adopted for. $p_2$ coded bits are mapped into the constellation symbols in correspondence with the plurality of constellation modes, i.e., refer to a mapping relationship between the plurality of constellation modes and the plurality of constellation symbols.

Figure 5:
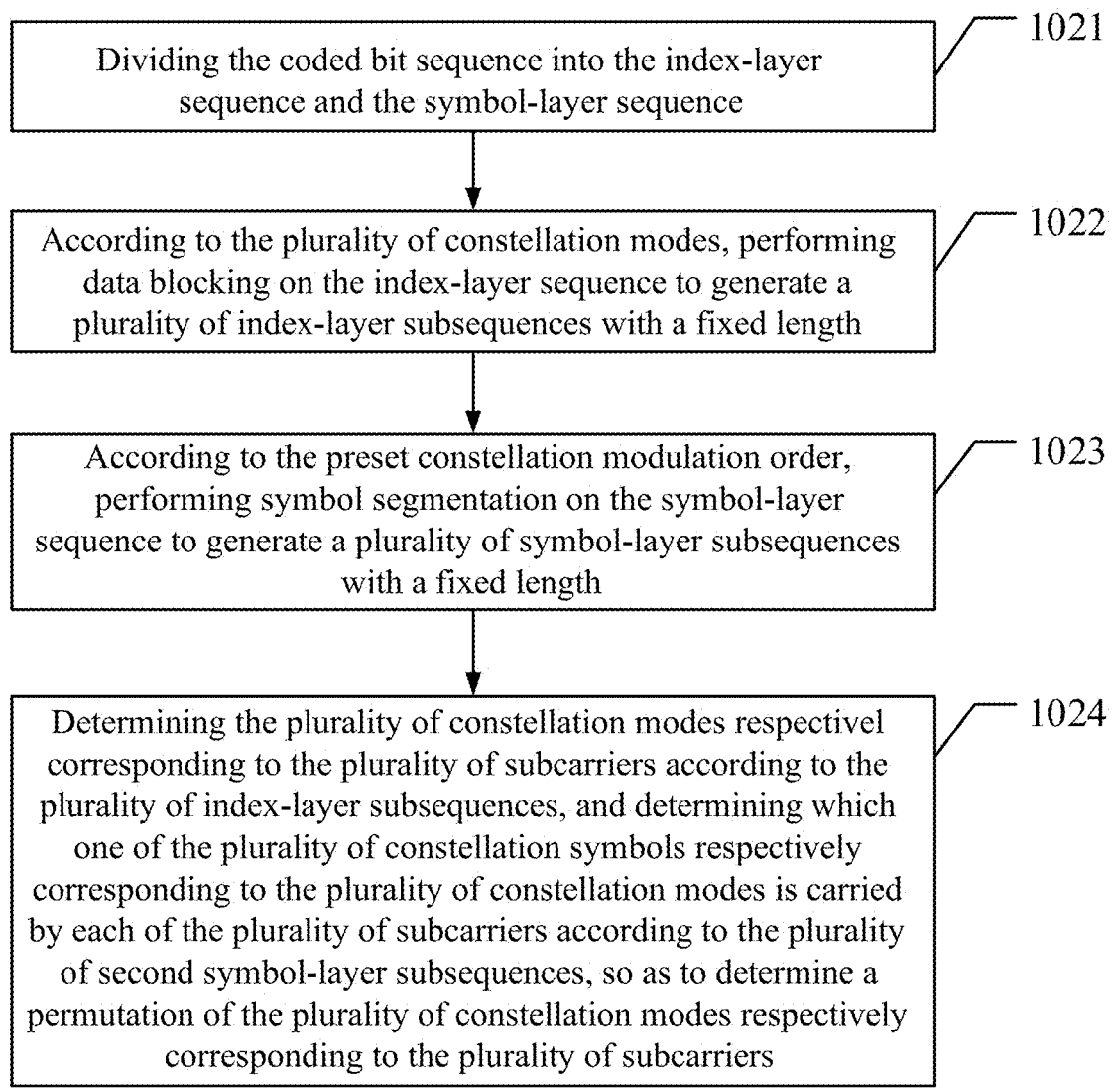
FIG. 5 is a flow chart of step (102) of the coding method in accordance with an embodiment of the present disclosure.

In some embodiments, as shown in FIG. 5, the step (102) is performed through the following steps.

Step (1021) The coded bit sequence is divided into the index-layer sequence and the symbol-layer sequence.

Step (1022) According to the plurality of constellation modes, data blocking is performed on the index-layer sequence to generate a plurality of index-layer subsequences with a fixed length.

Step (1023) According the preset constellation modulation order, symbol segmentation is performed on the symbol-layer sequence to generate a plurality of first symbol-layer subsequences with a fixed length. Rearrangement is performed on the plurality of first symbol-layer subsequences according to the plurality of constellation modes and the number of the plurality of first symbol-layer subsequences, so as to obtain a plurality of second symbol-layer subsequences with a fixed length. The number of the plurality of second symbol-layer subsequences is equal to a product of the number of the plurality of constellation modes and the number of the plurality of first symbol-layer subsequences.

Step (1024) The plurality of constellation modes respectively corresponding to the plurality of subcarriers is determined according to the plurality of index-layer subsequences, and which one of the plurality of constellation symbols respectively corresponding to the plurality of constellation modes is carried by each of the plurality of subcarriers is determined according to the plurality of second symbol-layer subsequences, so as to determine a permutation of the plurality of constellation modes respectively corresponding to the plurality of subcarriers.

It should be noted that a to-be-coded source sequence $U_A$ is first divided into index-layer subsequences $U_{index}$ and symbol-layer subsequences $U_{symbol}$. For the index-layer subsequences $U_{index}$, $p_1 = \lfloor \log_2(n!) \rfloor$ polar encoders are adopted for encoding to generate the p coded bit sequences $V_{index} = \{v_{index,1}, \ldots, v_{index,p1}\}$ with a length of g, where n is the number of the plurality of constellation modes. For the symbol-layer subsequences $U_{symbol}$, $m = \log_2 M$ polar encoders are adopted for encoding to generate m coded bit sequences $V_{symbol,i} = \{v_{symbol,1}, \ldots, v_{symbol,m}\}^T$ with a length of ng, where M is the constellation modulation order, and $v_{symbol,i} = \{v_i^{(1)}, v_i^{(2)}, \ldots, v_i^{(ng)}\}^T$. Then, $V_{symbol}$ is rearranged into $p_2$ coded bit sequences with a length of g, expressed as:

$$V_{symbol} = \begin{bmatrix} v_1^{(1)} & v_1^{(n+1)} & & v_1^{((g-1)n+1)} \\ \vdots & \vdots & \cdots & \vdots \\ v_m^{(1)} & v_m^{(n+1)} & & v_m^{((g-1)n+1)} \\ \vdots & \vdots & \ddots & \vdots \\ v_1^{(n)} & v_1^{(2n)} & & v_1^{(gn)} \\ \vdots & \vdots & \ddots & \vdots \\ v_m^{(n)} & v_m^{(2n)} & & v_m^{(gn)} \end{bmatrix} = \{v_{symbol,1}, \ldots, v_{symbol,m}\}^T$$

In the above equation, $p_2 = nm$.

Then, the obtained codeword sequences are integrated into the coded bit sequence $V_A = \{V_{index}^T, V_{symbol}^T\}^T$, and evenly divided into g sub-blocks $\{v_1, \ldots, v_g\}$, where the number of coded bits in each sub-block is $$p = \frac{N}{g} = p_1 + p_2,$$

and N is a total code length. The constellation mode $\{Q_1, \ldots, Q_n\}$ adopted by each subcarrier is determined according to the $p_1$ coded bits. The constellation symbols corresponding to each constellation mode are determined according to the $p_2$ coded bits.

Step (103) According to a correspondence relationship between the plurality of subcarriers and the plurality of constellation modes and a correspondence relationship between the plurality of constellation modes and the plurality of constellation symbols, the coded bit sequence is converted into a plurality of constellation symbols by a constellation symbol mapper. The plurality of constellation symbols are respectively loaded to the plurality of subcarriers for transmission.

Figure 4:
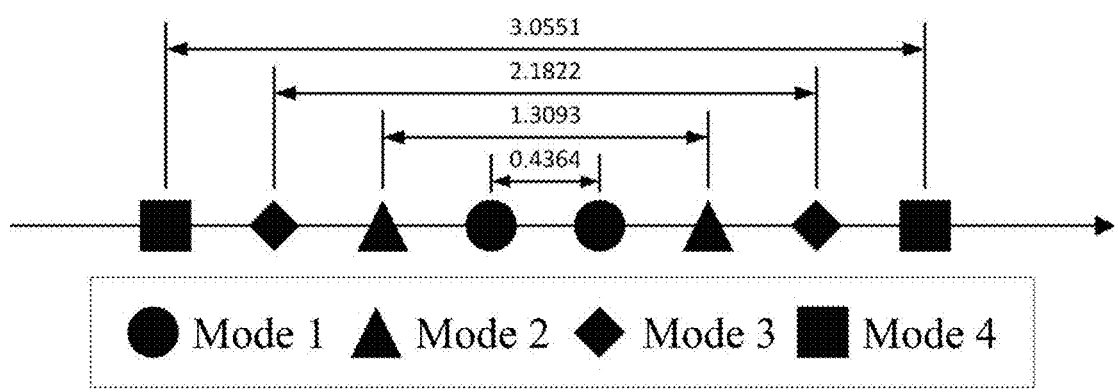
FIG. 4 shows results of constellation mode division in accordance with an embodiment of the present disclosure with 8PAM.

It should be noted that based on the plurality of constellation modes corresponding to the plurality of subcarriers obtained in the previous step and the mapping relationship between the plurality of constellation modes and the plurality of constellation symbols, for any sequence sub-block, the correspondence relationship between the plurality of subcarriers and the plurality of constellation modes and the correspondence relationship between the plurality of constellation modes adopted by the subcarriers and the plurality of constellation symbols are determined. The coded bit sequence is converted into the plurality of constellation symbols, and the plurality of constellation symbols are respectively loaded to the plurality of subcarriers. The constellation mode division result is shown in FIG. 4.

Figure 6:
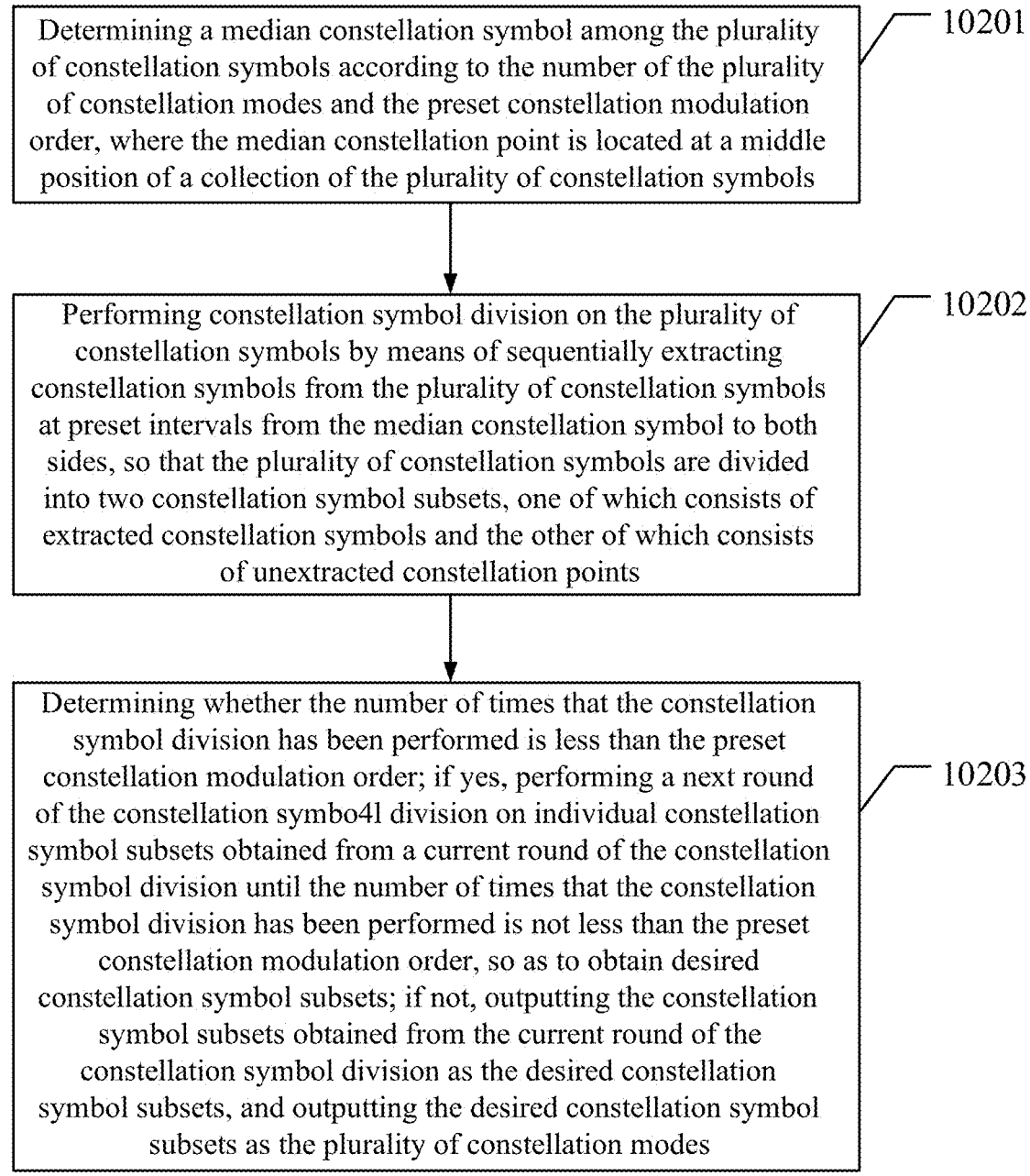
FIG. 6 is a flow chart of step (103) of the coding method in accordance with an embodiment of the present disclosure.

Specifically, as shown in FIG. 6, the permutation of the plurality of constellation modes respectively corresponding to the plurality of subcarriers is determined through the following steps.

Step (10201) According to the number of the plurality of constellation modes and the preset constellation modulation order, a median constellation symbol among the plurality of constellation symbols is determined. The median constellation symbol is located at a middle position of a collection of the plurality of constellation symbols.

Step (10202) Constellation symbol division is performed on the plurality of constellation symbols by means of sequentially extracting constellation symbols from the plurality of constellation symbols at preset intervals from the median constellation symbol to both sides, so that the plurality of constellation symbols are divided into two constellation symbol subsets, one of which consists of extracted constellation symbols and the other of which consists of unextracted constellation points.

Step (10203) Whether the number of times that the constellation symbol division has been performed is less than the preset constellation modulation order is determined. If yes, a next round of the constellation symbol division is performed on individual constellation symbol subsets obtained from a current round of the constellation symbol division until the number of times that the constellation symbol division has been performed is not less than the preset constellation modulation order, so as to obtain desired constellation symbol subsets. If not, the constellation symbol subsets obtained from the current round of the constellation symbol division are output as the desired constellation symbol subsets. The desired constellation symbol subsets is output as the plurality of constellation modes.

The constellation symbols contained in the same constellation symbol subset all belong to the same constellation mode.

It should be noted that, a minimum inter-mode distance (MIRD) of an M-ary pulse amplitude modulation (PAM) (denoted by PAM(M,n)) of n constellation modes with unit power is calculated by the following equation:

$$d_{inter}(M, n) = \frac{2\sqrt{3}}{\sqrt{(Mn)^2 - 1}}$$

The Mn constellation symbols with a unit spacing of $$d = d_{inter}(M, n) = \frac{2\sqrt{3}}{\sqrt{(Mn)^2 - 1}}$$

are divided alternately into two constellation symbol subsets from the middle to both ends. Specifically, the first division is performed on a constellation symbol set $s = \{s_1, s_2, \ldots, s_{Mn-1}, s_{Mn}\}$, where $s_m$ is an m-th constellation symbol (m=1, . . . , Mn) in PAM(M,n), such that the constellation symbol set is divide it into two constellation symbol subsets $s_{1,1} = \{s_2, s_4, \ldots, s_{Mn/2-2}, s_{Mn/2}, s_{Mn/2+1}, s_{Mn/2+3}, \ldots, s_{Mn-3}, s_{Mn-1}\}$ and $s_{1,2} = \{s_1, s_3, \ldots, s_{Mn/2-3}, s_{Mn/2-1}, s_{Mn/2+2}, s_{Mn/2+4}, \ldots, s_{Mn-2}, s_{Mn}\}$.

Each of the two constellation symbol subsets is subjected to a second round of the constellation symbol division with same operation as the first round of the constellation symbol division alternately from the middle to both ends, such that each of the two constellation symbol subsets is divided into two constellation symbol subsets, that is, $s_{1,1}$ is divided into $s_{2,1} = \{s_4, \ldots, s_{Mn/2}, s_{Mn/2+1}, \ldots, s_{Mn-3}\}$ and $s_{2,3} = \{s_2, \ldots, s_{Mn/2-2}, s_{Mn/2+3}, \ldots, s_{Mn-1}\}$, and $s_{1,2}$ is divided into $s_{2,2} = \{s_3, s_{Mm/2-1}, s_{Mn/2+2}, \ldots, s_{Mn-2}\}$ and $s_{2,4} = \{s_1, \ldots, s_{Mn/2-3}, s_{Mn/2+4}, \ldots, s_{Mn}\}$.

The same operation is continuously performed on each constellation symbol subset obtained from a current round of the constellation symbol division until the number of times that the constellation symbol division has been performed is not less than the preset constellation modulation order. In the i-th division (i=(2, ..., log₂ n)), $\{s_{i-1,1}, s_{i-1,2}, \ldots, s_{i-1,2^{i-1}}\}$ is divided into $\{\{s_{i,1}, s_{i,2^{i-1}+1}\}, \{s_{i,2}, s_{i,2^{i-1}+2}\}, \ldots, \{s_{i,2^{i-1}}, s_{i,2^i}\}\}$, where $s_{i,j}$ is a j-th constellation symbol subset (j=1, ..., $2^i$) obtained after the i-th division. After log₂ n divisions, the constellation diagram PAM(M,n) is divided into n constellation symbol subsets $\{s_{log_2 n,2}, s_{log_2 n,2}, \ldots, s_{log_2 n,n}\}$, which are marked as the n constellation modes, i.e., $\{Q_1, Q_2, \ldots, Q_n\} = \{s_{log_2 n,2}, s_{log_2 n,2}, \ldots, s_{log_2 n,n}\}$, so as to obtain n symmetrically distributed M-ary PAM constellation modes.

A minimum intra-mode distance (MIAD) of the q-th constellation mode can be calculated by the following equation:

$$d_{intra}^q(M, n) = \frac{2\sqrt{3}(2q-1)}{\sqrt{(Mn)^2 - 1}}, q = 1, \ldots, n$$

In an embodiment, a constellation mode division method with 8PAM where M=2 and n=4 (i.e., PAM(2,4)) is shown in FIG. 4. First, the MIRD of PAM(2,4) constellation modulation with unit power is $$d_{inter}(2, 4) = \frac{2}{\sqrt{21}} = 0.4364.8$$

constellation symbols s={s₁, s₂, s₃, s₄, s₅, s₆, s₇, s₈} of PAM(2,4) are divided into two constellation symbol subsets $s_{1,1}=\{s_2, s_4, s_5, s_7\}$ and $s_{1,2}=\{s_1, s_3, s_6, s_8\}$. Then, the two constellation symbol subsets $s_{1,1}$ and $s_{1,2}$ are respectively subjected to division, i.e., $s_{1,1}$ is divided into $s_{2,1}=\{s_4, s_5\}$ and $s_{2,3}=\{s_2, s_7\}$, and $s_{1,2}$ is divided into $s_{2,2}=\{s_3, s_6\}$ and $s_{2,4}=\{s_1, s_8\}$. In this way, the PAM(2,4) constellation diagram is divided into 4 constellation symbol subsets, which are marked as 4 constellation modes, i.e., mode 1 is represented as $Q_1=s_{2,1}$, mode 2 is represented as $Q_2=s_{2,2}$, mode 3 is represented as $Q_3=s_{2,3}$, and mode 4 is represented as $Q_4=s_{2,4}$, so as to obtain 4 symmetrically distributed 2PAM constellation modes. The MIADs of modes 1-4 are $$d_{intra}^1(2, 4) = \frac{2}{\sqrt{21}} = 0.4364,$$

$$d_{intra}^2(2, 4) = \frac{6}{\sqrt{21}} = 1.3093, d_{intra}^3(2, 4) = \frac{10}{\sqrt{21}} = 2.1822$$

and $$d_{intra}^4(2, 4) = \frac{14}{\sqrt{21}} = 3.0551,$$

respectively.

Step (104) The plurality of subcarriers are combined into an OFDM transmission block by a frequency-domain multiplexer. The OFDM transmission block is subjected to transmission preprocessing and up-conversion. The OFDM transmission block is sent by an antenna array to a receiver via a transmission channel. Inverse processing is performed on the OFDM transmission block by the receiver to obtain a source estimation sequence.

It should be noted that, according to the constellation sequence processing on a single sequence sub-block provided in step (103), the constellation mode corresponding to each sequence sub-block can be obtained by performing the operation of step (103) on the remaining sequence sub-blocks. Then, the sequence sub-blocks are merged into an OFDM transmission block, which is subjected to transmission preprocessing such as IFFT, CP insertion and P/S conversion. The preprocessed signal is sent to the receiving end via a multipath Rayleigh fading channel, such that the inverse processing of the transmitting end can be performed on the preprocessed signal at the receiving end. Firstly, the signal received by the receiving end is subjected to S/P conversion, CP removal and FFT transformation. According to the original order of the subcarriers $\{y_\beta(1), \ldots, y_\beta(n)\}$, ($\beta=1, \ldots, g$), each of the plurality of subcarriers is subjected to serial detection to obtain a detection result, which is passed to a next subcarrier. The probability that the 5-th constellation mode is selected by the 6-th subcarrier in the n-th sub-block is calculated, expressed as:

$$\lambda_\beta(\eta) = \ln \frac{P(x_\beta(\eta) = Q_\varsigma \mid y_\beta(\eta))}{P(x_\beta(\eta) \neq Q_\varsigma \mid y_\beta(\eta))}, \varsigma = 1, \ldots, n$$

$P(x_\beta(\eta)=Q_\varsigma|y_\beta(n))$ is a posterior probability that a constellation mode $Q_\varsigma$ is selected by a transmitted signal $x_\beta(n)$ when a signal $y_\beta(n)$ is received by the receiving end. $P(x_\beta(n)=Q_\varsigma|y_\beta(n))$ is a posterior probability that the constellation mode $Q_\varsigma$ is not selected by the transmitted signal $x_\beta(n)$ when the signal $y_\beta(n)$ is received by the receiving end.

Next, the posterior probabilities $P(x_\beta(n)=Q_\varsigma)$ and $P(x_\beta(n) \neq Q_\varsigma)$ are respectively calculated through the following equations:

$$P(x_\beta(\eta) = Q_\varsigma) = \frac{\exp(\lambda_\beta(\eta))}{1 + \exp(\lambda_\beta(\eta))}$$

$$P(x_\beta(\eta) \neq Q_\varsigma) = \frac{1}{1 + \exp(\lambda_\beta(\eta))}$$

The soft information is input to the next subcarrier in sequence to obtain a constellation mode selection probability, expressed as:

$$P'(x_\beta(\eta) = Q_\varsigma) = \prod_{k=1}^{\eta-1} P(x_\beta(k) \neq Q_\varsigma) P(x_\beta(\eta) = Q_\varsigma)$$

Index-bit layers are subjected to serial detection and decoding based on $P'(x_\beta(n)=Q_\varsigma)$, and the decoding result of each index-bit layer is transmitted to the next index-bit layer to assist detection and decoding. Then, the decoding results of the entire index-bit layers are re-encoded and input into a symbol demodulator to reduce the estimation ambiguity of the soft information of the symbol-bit layers. The symbol-bit layers are demapped and decoded in a similar serial manner, so as to obtain the overall decoding result.

More specifically, after determining the constellation mode corresponding to each subcarrier or loading the plurality of constellation symbols to the plurality of subcarriers, the above coding method further includes the following step.

A mean Euclidean intra-mode distance (MEIAD) of the plurality of constellation modes is calculated. Reliability among the plurality of constellation modes is determined according to the MEIAD.

Since the plurality of constellation modes are transmitted in the subcarriers with the same channel environment, the reliability differences between the n constellation modes can be measured by the MEIADs. The MEIADs of the traditional constellation mode division methods and of the present disclosure with 8PAM are comparatively shown in Table 1. It can be seen that the constellation mode division method of the present disclosure causes the MEIAD to change from being equal to increasing one by one. This indicates that different models result in different reliability, which enhances the correlation and dependence between various constellation modes and improves the polarization degree of the system, thereby facilitating the performance improvement of the multi-level polar-coded modulation scheme based on MM-OFDM-IM.

TABLE 1

Comparison of MEIADs of traditional constellation mode division methods and the method of the present disclosure

| Constellation modes | Traditional scheme | Method of the present disclosure |
|---|---|---|
| Mode 1 | 1.7457 | 0.4364 |
| Mode 2 | 1.7457 | 1.3093 |
| Mode 3 | 1.7457 | 2.1822 |
| Mode 4 | 1.7457 | 3.0551 |

Figure 7:
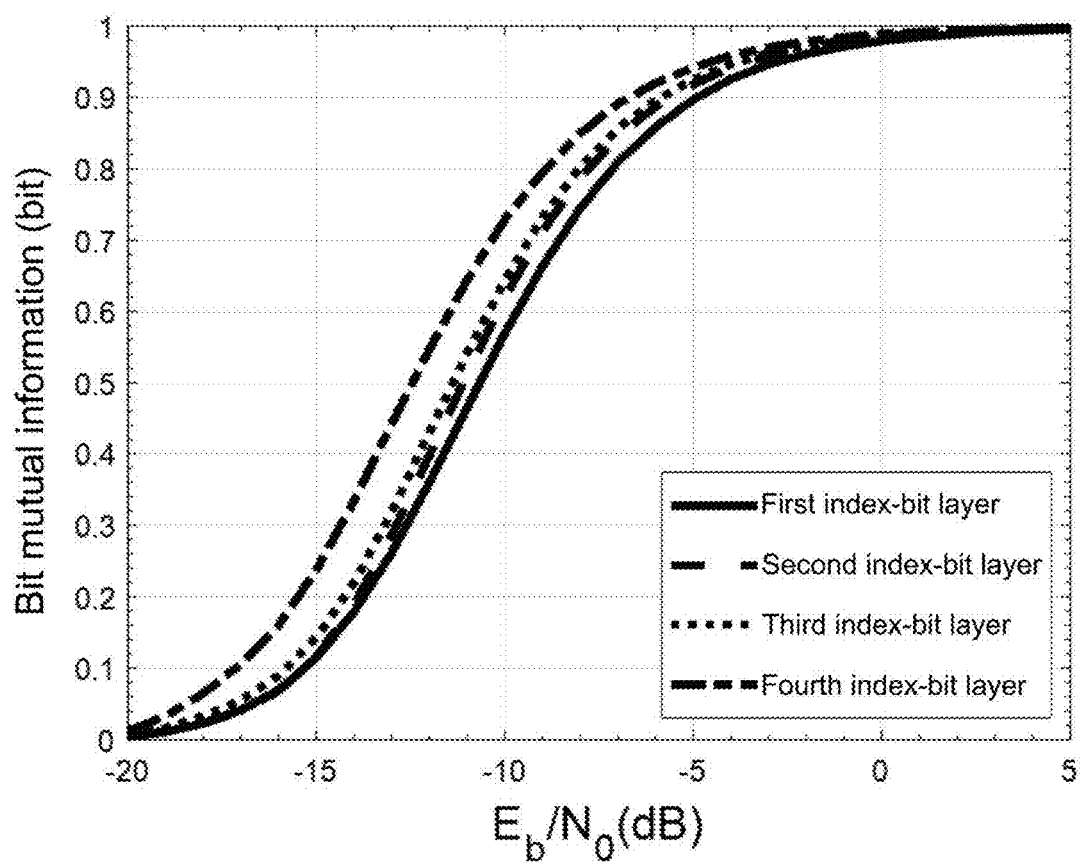
FIG. 7 shows capacity distribution of index-bit layers based on a constellation mode division method in the prior art.
Figure 8:
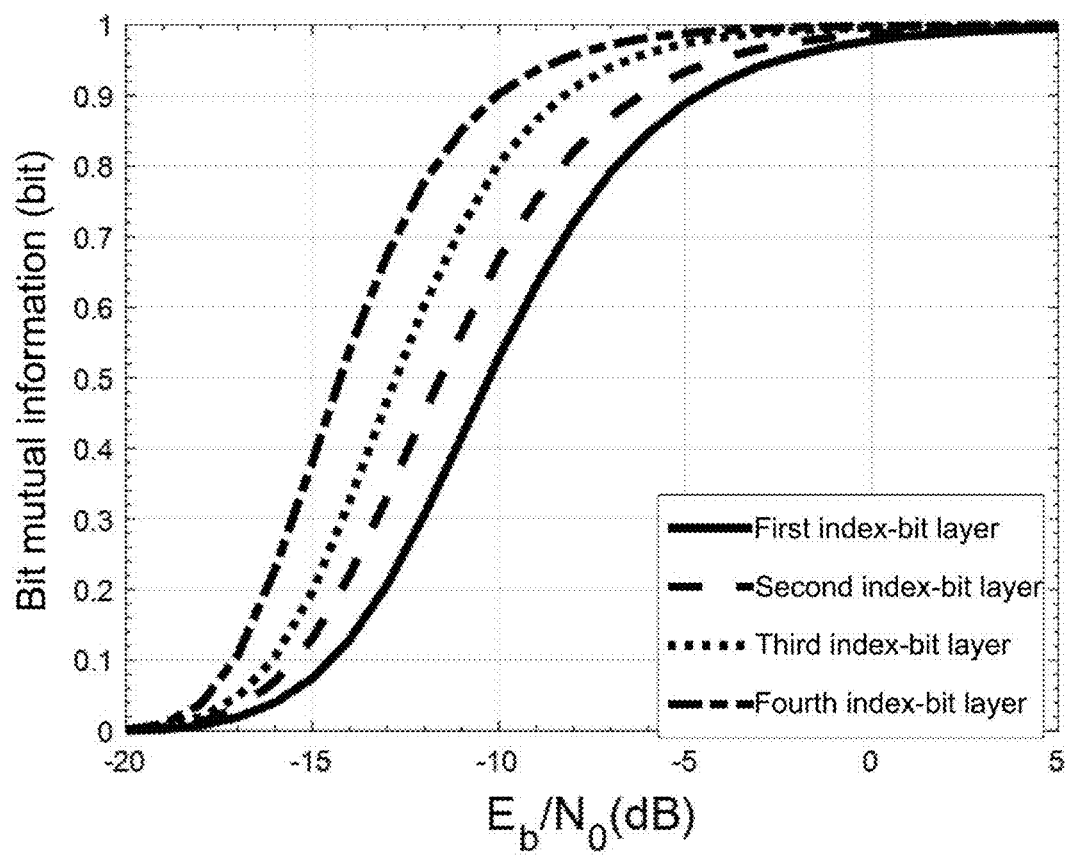
FIG. 8 shows capacity distribution of index-bit layers based on a constellation mode division method in accordance with an embodiment of the present disclosure.

FIGS. 7-8 respectively show capacity distribution of the index-bit subchannel adopting the traditional constellation mode division methods and the method of the present disclosure. FIG. 7 shows capacity distribution of the index-bit layers obtained by the traditional constellation mode division method. FIG. 8 shows capacity distribution of the index-bit layers adopting the constellation mode division method of the present disclosure. It can be seen that the present disclosure leads to an increased difference between index-bit layers, and the capacity of each bit layer increases successively, which facilitates improvement of the performance of the multi-level scheme.

Figure 9:
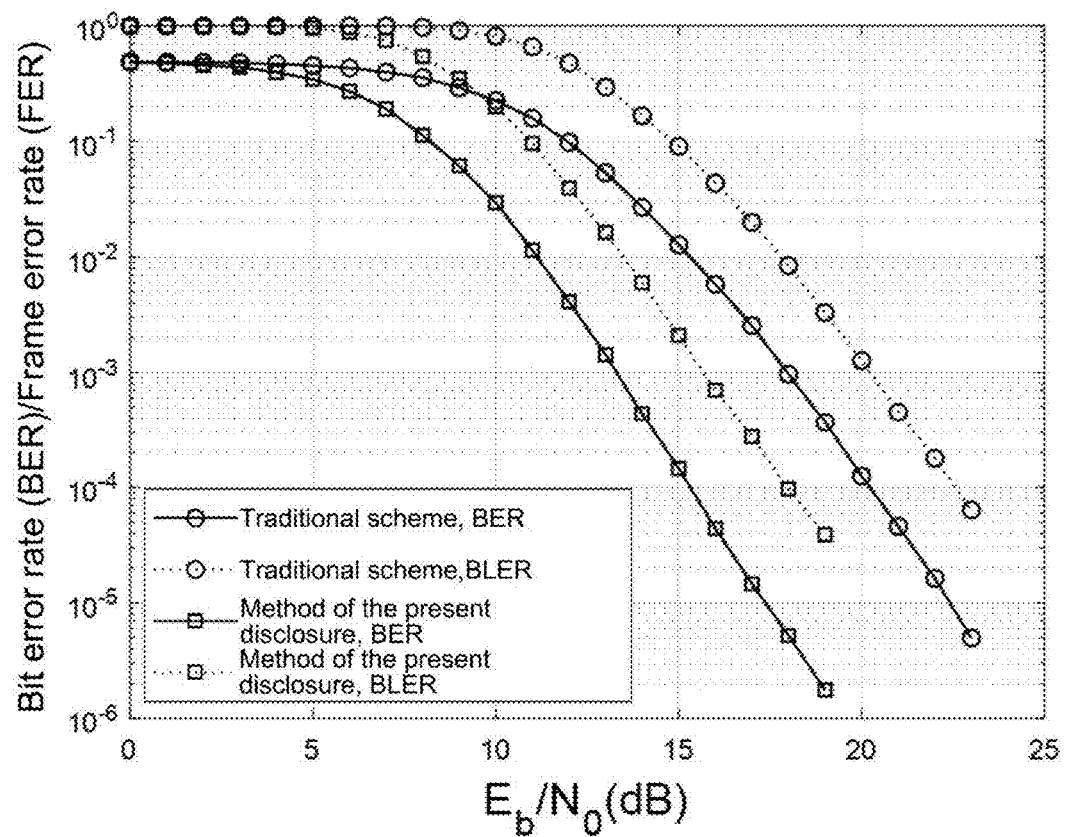
FIG. 9 shows comparison of bit error rate/frame error rate of coding methods in the prior art and in an embodiment of the present disclosure on a multipath Rayleigh fading channel.

FIG. 9 shows comparison of the bit error rate and frame error rate of the traditional scheme and the multi-level polar-coded modulation scheme based on MM-OFDM-IM of the present disclosure when the constellation modulation modes adopt 64QAM (i.e., the I and Q vectors are 8PAM respectively). Obviously, compared with the traditional scheme, the multi-level polar-coded modulation scheme of the present disclosure leads to a significant improved performance due to its higher system polarization degree.

Described above is the coding method based on MM-OFDM-IM in an embodiment of the present disclosure. A coding device based on MM-OFDM-IM in an embodiment of the present disclosure will be described in detail below.

Figure 10:
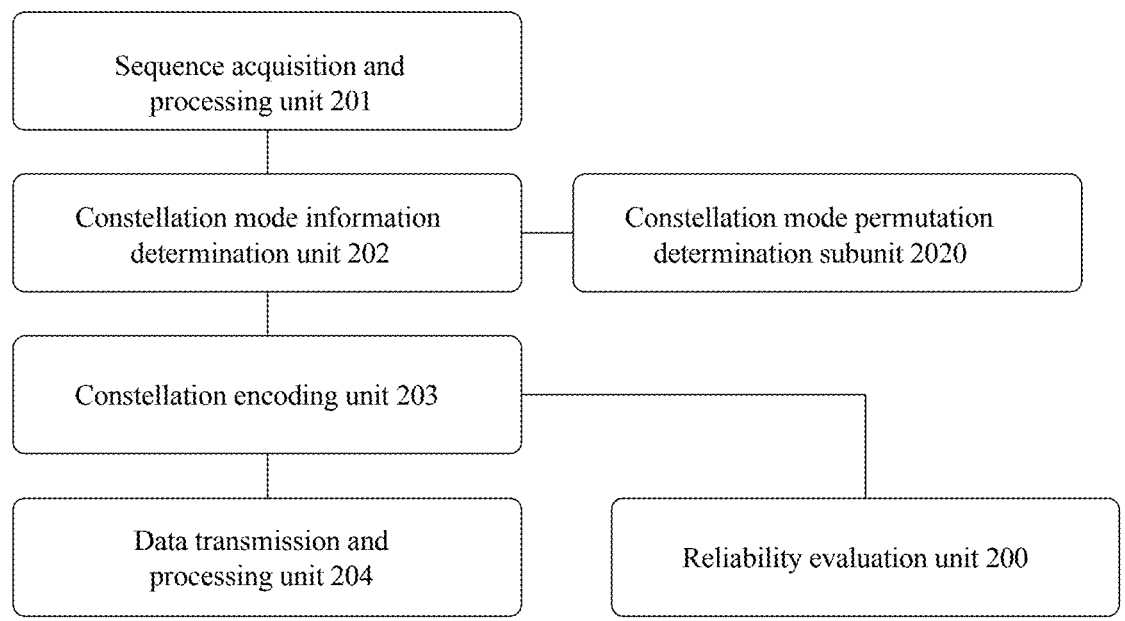
FIG. 10 is a structural diagram of a coding device based on MM-OFDM-IM in accordance with an embodiment of the present disclosure.

Referring to FIG. 10, a coding device based on MM-OFDM-IM is provided, including a sequence acquisition and processing unit 201, a constellation mode information determination unit 202, a constellation coding unit 203 and a data transmission and processing unit 204.

The sequence acquisition and processing unit 201 is configured to acquire a to-be-encoded source sequence input from a transmitter, and encode the to-be-encoded source sequence to generate a coded bit sequence.

The constellation mode information determination unit 202 is configured to perform bit-splitting on the coded bit sequence according to a preset constellation modulation order and a preset constellation mode number, such that the coded bit sequence is divided into an index-layer sequence and a symbol-layer sequence, and determine, according to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers. The index-layer sequence is configured to transmit full permutation information of the plurality of constellation modes, and the symbol-layer sequence is configured to transmit constellation symbol information carried by a plurality of subcarriers. A constellation mode permutation corresponding to each of the plurality of subcarriers is in a symmetrical distribution.

The constellation coding unit 203 is configured to convert the coded bit sequence into the plurality of constellation symbols according to a correspondence relationship between the plurality of subcarriers and the plurality of constellation modes and a correspondence relationship between the plurality of constellation modes and the plurality of constellation symbols, and load the plurality of constellation symbols respectively to the plurality of subcarriers for transmission.

The data transmission and processing unit 204 is configured to combine the plurality of subcarriers into an OFDM transmission block, perform transmission preprocessing on the OFDM transmission block followed by up-conversion, send the OFDM transmission block to a receiver via a transmission channel, and perform inverse processing on the OFDM transmission block to obtain a source estimation sequence.

In an embodiment, the constellation mode information determination unit 202 includes a constellation mode arrangement determination subunit 2020, which is configured to perform, according to the plurality of constellation modes, data blocking on the index-layer sequence to generate a plurality of index-layer subsequences with a fixed length, perform, according to the preset constellation modulation order, symbol segmentation on the symbol-layer sequence to generate a plurality of first symbol-layer subsequences with a fixed length, perform rearrangement on the plurality of first symbol-layer subsequences according to the plurality of constellation modes and the number of the plurality of first symbol-layer subsequences, so as to obtain a plurality of second symbol-layer subsequences with a fixed length, determine the plurality of constellation modes respectively corresponding to the plurality of subcarriers according to the plurality of index-layer subsequences, and determine which one of the plurality of constellation symbols respectively corresponding to the plurality of constellation modes is carried by each of the plurality of subcarriers according to the plurality of second symbol-layer subsequences, so as to determine a permutation of the plurality of constellation modes respectively corresponding to the plurality of subcarriers. The number of the plurality of second symbol-layer subsequences is equal to a product of the number of the plurality of constellation modes and the number of the plurality of first symbol-layer subsequences.

In an embodiment, the coding device further includes a reliability evaluation unit 200, which is configured to calculate a mean Euclidean intra-mode distance of each of the plurality of constellation modes, and determine reliability among the plurality of constellation modes according to the mean Euclidean intra-mode distance.

It can be understood by those skilled in the art that for the convenience and simplicity of description, specific operating processes of the terminals, devices and units described above can be referred to the corresponding processes of the above method, and will not be described again in this application.

In the embodiments provided in this application, it should be understood that the terminals, devices and methods provided herein can be implemented in other ways. The above devices are merely illustrative. For example, the division of the units is only a logical function division. In practical implementation, there may be other ways of division. For example, multiple units or components can be combined or integrated into another system, or some features can be omitted, or not implemented. On the other hand, the coupling, direct coupling or communication connection between each other shown or discussed herein can be realized through some communication interfaces, and the indirect coupling or communication connection of the devices or units can be in electrical, mechanical or other forms.

Terms "first", "second", "third", "fourth", etc. (if any) in the specification and drawings of this application are adopted to distinguish similar objects, and are not necessarily adopted to describe a specific order or sequence. It should be understood that these terms can be interchanged where appropriate, so that the embodiments of the present disclosure described herein can, for example, be implemented in an order other than those illustrated or described herein. In addition, terms "comprise", "include", or any other variations thereof are intended to cover a non-exclusive inclusion such that a process, method, system, product or device includes not only those mentioned steps or units but also other steps or units not expressly listed, or steps or units that are inherent to such process, method, product or device.

It should be understood that in this application, "at least one (item)" means one or more, and "a plurality of" means two or more. In addition, "and/or" in the entire specification is adopted to describe the association relationship of associated objects, indicating that three relationships may exist. For example, "A and/or B" includes technical solution A, technical solution B, and a combination of A and B, where A and B can be singular or plural. The character "/" generally indicates that the objects associated before and after are in an "or" relationship. The expression "at least one of the following items" or similar expressions refers to any combination of these items, including any combination of single or plural items. For example, at least one of a, b or c may represent "a", "b", "c", "a and b", "a and c", "b and c", or "a, b and c", where a, b, c can be single or multiple.

The units described as separate components may or may not be physically separated, and the components displayed as units may or may not be physical units, that is, they may be located in one place or distributed on multiple network units. Some or all of the units may be selected according to actual needs to achieve the purpose of the scheme in the embodiments provided herein.

In addition, each functional unit described in the embodiments can be integrated into one processing unit, or exist physically independently, or two or more units can be integrated into one unit. The integrated unit mentioned above can be implemented in the form of hardware or software functional units.

If the function is implemented in a form of a software functional units and sold or used as an independent product, it can be stored in a computer-readable storage medium. Based on such understanding, the technical solutions of the present disclosure, or a part thereof contributing to the prior art, or a part of the technical solutions can be embodied in a form of a software product. The computer software product is stored in a storage medium and includes a plurality of instructions to allow a computer device (which can be a personal computer, a server, or a network device, etc.) to execute all or part of the steps of the methods described in various embodiments of this application. The above storage medium includes a U disk, a mobile hard disk, a read-only memory (ROM), a random-access memory (RAM), a magnetic disk, an optical disk and other medium that can store program code.

The embodiments described above are merely illustrative of the present disclosure, and are not intended to limit the patent scope of the present disclosure. Various modifications and replacements made by those skilled in the art without departing from the spirit of the disclosure shall fall within the scope of the present disclosure defined by the appended claims.

What is claimed is:

1. A coding method based on multiple-mode orthogonal frequency division multiplexing with index modulation (MM-OFDM-IM), comprising:
   (1) acquiring a to-be-encoded source sequence input from a transmitter, and encoding, by an encoder, the to-be-encoded source sequence to generate a coded bit sequence;
   (2) performing bit-splitting on the coded bit sequence according to a preset constellation modulation order and a preset constellation mode number, such that the coded bit sequence is divided into an index-layer sequence and a symbol-layer sequence; wherein the index-layer sequence is configured to transmit full permutation information of the plurality of constellation modes, and the symbol-layer sequence is configured to transmit constellation symbol information carried by a plurality of subcarriers; and
   determining, according to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers; wherein a constellation mode permutation corresponding to each of the plurality of subcarriers is in a symmetrical distribution;
   (3) converting, by a constellation symbol mapper, the coded bit sequence into the plurality of constellation symbols according to a correspondence relationship between the plurality of subcarriers and the plurality of constellation modes and a correspondence relationship between the plurality of constellation modes and the plurality of constellation symbols; and loading the plurality of constellation symbols respectively to the plurality of subcarriers for transmission; and
   (4) combining, by a frequency-domain multiplexer, the plurality of subcarriers into an orthogonal frequency division multiplexing (OFDM) transmission block; performing transmission preprocessing on the OFDM transmission block followed by up-conversion; and
   sending, by an antenna array, the OFDM transmission block to a receiver via a transmission channel; and performing, by the receiver, inverse processing on the OFDM transmission block to obtain a source estimation sequence;
   wherein the plurality of constellation modes and the plurality of constellation symbols are determined through steps of:

according to the plurality of constellation modes, performing data blocking on the index-layer sequence to generate a plurality of index-layer subsequences with a fixed length;

according to the preset constellation modulation order, performing symbol segmentation on the symbol-layer sequence to generate a plurality of first symbol-layer subsequences with a fixed length; performing rearrangement on the plurality of first symbol-layer subsequences according to the plurality of constellation modes and the number of the plurality of first symbol-layer subsequences, so as to obtain a plurality of second symbol-layer subsequences with a fixed length; wherein the number of the plurality of second symbol-layer subsequences is equal to a product of the number of the plurality of constellation modes and the number of the plurality of first symbol-layer subsequences; and determining the plurality of constellation modes respectively corresponding to the plurality of subcarriers according to the plurality of index-layer subsequences, and determining which one of the plurality of constellation symbols respectively corresponding to the plurality of constellation modes is carried by each of the plurality of subcarriers according to the plurality of second symbol-layer subsequences, so as to determine a permutation of the plurality of constellation modes respectively corresponding to the plurality of subcarriers;

the permutation of the plurality of constellation modes respectively corresponding to the plurality of subcarriers is determined through steps of:

determining a median constellation symbol among the plurality of constellation symbols according to the number of the plurality of constellation modes and the preset constellation modulation order, wherein the median constellation point is located at a middle position of a collection of the plurality of constellation symbols;

performing constellation symbol division on the plurality of constellation symbols by means of sequentially extracting constellation symbols from the plurality of constellation symbols at preset intervals from the median constellation symbol to both sides, so that the plurality of constellation symbols are divided into two constellation symbol subsets, one of which consists of extracted constellation symbols and the other of which consists of unextracted constellation points;

determining whether the number of times that the constellation symbol division has been performed is less than the preset constellation modulation order; if yes, performing a next round of the constellation symbol division on individual constellation symbol subsets obtained from a current round of the constellation symbol division until the number of times that the constellation symbol division has been performed is not less than the preset constellation modulation order, so as to obtain desired constellation symbol subsets; if not, outputting the constellation symbol subsets obtained from the current round of the constellation symbol division as the desired constellation symbol subsets; and outputting the desired constellation symbol subsets as the plurality of constellation modes.

2. The coding method of claim 1, further comprising:
calculating a mean Euclidean intra-mode distance of each of the plurality of constellation modes; and
determining a reliability among the plurality of constellation modes according to the mean Euclidean intra-mode distance.

3. The coding method of claim 1, wherein the transmission preprocessing comprises inverse fast Fourier transform (IFFT), cyclic prefix (CP) insertion and parallel-to-serial conversion.

4. A coding device based on MM-OFDM-IM, comprising:
a sequence acquisition and processing unit;
a constellation mode information determination unit;
a constellation coding unit; and
a data transmission and processing unit;
wherein the sequence acquisition and processing unit is configured to acquire a to-be-encoded source sequence input from a transmitter, and encode the to-be-encoded source sequence to generate a coded bit sequence;

the constellation mode information determination unit is configured to perform bit-splitting on the coded bit sequence according to a preset constellation modulation order and a preset constellation mode number, such that the coded bit sequence is divided into an index-layer sequence and a symbol-layer sequence, and determine, according to the index-layer sequence and the symbol-layer sequence, a plurality of constellation modes respectively corresponding to the plurality of subcarriers and which one of a plurality of constellation symbols respectively corresponding to the plurality of constellation modes is carried by each of the plurality of subcarriers; wherein the index-layer sequence is configured to transmit full permutation information of the plurality of constellation modes, and the symbol-layer sequence is configured to transmit constellation symbol information carried by a plurality of subcarriers; and a constellation mode permutation corresponding to each of the plurality of subcarriers is in a symmetrical distribution;

the constellation coding unit is configured to convert the coded bit sequence into the plurality of constellation symbols according to a correspondence relationship between the plurality of subcarriers and the plurality of constellation modes and a correspondence relationship between the plurality of constellation modes and the plurality of constellation symbols, and load the plurality of constellation symbols respectively to the plurality of subcarriers for transmission;

the data transmission and processing unit is configured to combine the plurality of subcarriers into an OFDM transmission block, perform transmission preprocessing on the OFDM transmission block followed by up-conversion, send the OFDM transmission block to a receiver via a transmission channel, and perform inverse processing on the OFDM transmission block to obtain a source estimation sequence;

the constellation mode information determination unit is configured to perform, according to the plurality of constellation modes, data blocking on the index-layer sequence to generate a plurality of index-layer subsequences with a fixed length, perform, according to the preset constellation modulation order, symbol segmentation on the symbol-layer sequence to generate a plurality of first symbol-layer subsequences with a fixed length, perform rearrangement on the plurality of first symbol-layer subsequences according to the plurality of constellation modes and the number of the plurality of first symbol-layer subsequences, so as to obtain a plurality of second symbol-layer subsequences with a fixed length, determine the plurality of constellation modes respectively corresponding to the plurality of subcarriers according to the plurality of index-layer subsequences, and determine which one of the plurality of constellation symbols respectively corresponding to the plurality of constellation modes is carried by each of the plurality of subcarriers according to the plurality of second symbol-layer subsequences, so as to determine a permutation of the plurality of constellation modes respectively corresponding to the plurality of subcarriers; wherein the number of the plurality of second symbol-layer subsequences is equal to a product of the number of the plurality of constellation modes and the number of the plurality of first symbol-layer subsequences; and the constellation mode information determination unit comprises a constellation mode permutation determination subunit; and the constellation mode permutation determination subunit is configured to determine a median constellation symbol among the plurality of constellation symbols according to the number of the plurality of constellation modes and the preset constellation modulation order, perform constellation symbol division on the plurality of constellation symbols by means of sequentially extracting constellation symbols from the plurality of constellation symbols at preset intervals from the median constellation symbol to both sides, so that the plurality of constellation symbols are divided into two constellation symbol subsets, one of which consists of extracted constellation symbols and the other of which consists of unextracted constellation points, determine whether the number of times that the constellation symbol division has been performed is less than the preset constellation modulation order, if yes, perform a next round of the constellation symbol division on individual constellation symbol subsets obtained from a current round of the constellation symbol division until the number of times that the constellation symbol division has been performed is not less than the preset constellation modulation order, so as to obtain desired constellation symbol subsets, if not, output the constellation symbol subsets obtained from the current round of the constellation symbol division as the desired constellation symbol subsets, and output the desired constellation symbol subsets as the plurality of constellation modes; wherein the median constellation point is located at a middle position of a collection of the plurality of constellation symbols.

5. The coding device of claim 4, further comprising:
a reliability evaluation unit;
wherein the reliability evaluation unit is configured to calculate a mean Euclidean intra-mode distance of each of the plurality of constellation modes, and determine a reliability among the plurality of constellation modes according to the mean Euclidean intra-mode distance.

6. The coding device of claim 4, wherein the transmission preprocessing comprises IFFT, CP insertion and parallel-to-serial conversion.

* * * * *